(12) United States Patent
  Shin

(10) Patent No.: US 8,090,561 B1
(45) Date of Patent: Jan. 3, 2012

(54) SYSTEM AND METHOD FOR IN SITU DISPLAY OF A VIRTUAL WHEEL ON A WHEELED VEHICLE

(76) Inventor: Jai Shin, Brentwood, MD (US)

( * ) Notice: Subject to any disclaimer, the term of this patent is extended or adjusted under 35 U.S.C. 154(b) by 593 days.

(21) Appl. No.: 12/191,461

(22) Filed: Aug. 14, 2008

(51) Int. Cl.
  G06G 7/48 (2006.01)
  G09F 21/04 (2006.01)
  G06F 7/00 (2006.01)
  G09G 5/00 (2006.01)

(52) U.S. Cl. .................. 703/8; 40/587; 701/36; 345/207

(58) Field of Classification Search ........ 703/8; 40/587; 701/36; 345/207
  See application file for complete search history.

(56) References Cited

U.S. PATENT DOCUMENTS

| | | | |
|---|---|---|---|
| 1,505,761 A | | 8/1924 | Adams |
| 1,796,628 A | | 3/1931 | Seward |
| 2,077,690 A | | 4/1937 | Harrison |
| 2,860,436 A | | 11/1958 | Silver |
| 3,426,463 A | * | 2/1969 | Weisenbach ............. 40/587 |
| 3,611,601 A | * | 10/1971 | Stropkay et al. ............. 40/587 |
| 3,763,584 A | | 10/1973 | Falkenstein |
| 3,864,860 A | * | 2/1975 | Merzweiler ............. 40/587 |
| 3,945,132 A | | 3/1976 | Parmelee |
| 4,214,683 A | * | 7/1980 | Wills et al. .................. 224/42.2 |
| D269,191 S | * | 5/1983 | Segal .......................... D20/35 |
| 5,072,536 A | * | 12/1991 | Matthews et al. ............. 40/587 |
| 5,450,094 A | * | 9/1995 | Li et al. ........................ 345/31 |
| 6,199,026 B1 | * | 3/2001 | Shiraishi et al. ............. 702/140 |
| 6,363,542 B1 | | 4/2002 | Pope, Sr. |
| 6,363,642 B1 | * | 4/2002 | Johnson et al. ............. 40/587 |
| 6,525,725 B1 | * | 2/2003 | Deering ....................... 345/419 |
| 6,753,879 B1 | | 6/2004 | Deleeuw |
| 6,879,961 B1 | | 4/2005 | Pathirana |
| 6,917,894 B2 | * | 7/2005 | Inge ............................. 702/155 |
| 6,926,369 B2 | | 8/2005 | McCaster, III et al. |
| 7,271,813 B2 | | 9/2007 | Gilbert |
| 7,407,033 B2 | * | 8/2008 | Wilson ........................ 362/500 |
| 7,479,967 B2 | * | 1/2009 | Bachelder et al. ............. 345/592 |
| 7,502,036 B2 | * | 3/2009 | Kramer et al. ................. 345/629 |
| 7,834,893 B2 | * | 11/2010 | Wanda et al. ................. 345/633 |
| 2002/0093538 A1 | * | 7/2002 | Carlin .......................... 345/778 |
| 2002/0158872 A1 | * | 10/2002 | Randel ........................ 345/426 |
| 2005/0174361 A1 | | 8/2005 | Kobayashi et al. |

(Continued)

FOREIGN PATENT DOCUMENTS

JP 2002208020 A * 7/2002

Primary Examiner — Kamini S Shah
Assistant Examiner — Akash Saxena
(74) Attorney, Agent, or Firm — Rosenberg, Klein & Lee

(57) ABSTRACT

A system and method are provided for visually simulating physical installation of a virtual wheel portion on a wheeled vehicle. The system generally comprises a portable display unit, a controller unit, and a support unit. The portable display unit is operable to graphically render an image of a preselected virtual wheel. The controller unit is operably coupled to the display unit for generating the image selectively for one of a plurality of distinct virtual wheel types. The controller unit adaptively generates the preselected virtual wheel image responsive to a viewing factor. The support unit is coupled to the display unit for adjustably situating such display unit to substantially mask a wheel of the vehicle, whereby the image of the preselected virtual wheel is visually integrated with the vehicle in substantially seamless manner to visually simulate its physical installation on the vehicle.

20 Claims, 7 Drawing Sheets

U.S. PATENT DOCUMENTS

| | | |
|---|---|---|
| 2006/0017885 A1* | 1/2006 | Tang .............................. 353/13 |
| 2006/0082213 A1* | 4/2006 | Tirado ..................... 301/37.109 |
| 2006/0277806 A1 | 12/2006 | DoVale et al. |
| 2006/0287137 A1 | 12/2006 | Chu |
| 2007/0097698 A1* | 5/2007 | Song et al. ..................... 40/587 |
| 2007/0200421 A1* | 8/2007 | DoVale et al. ............. 301/37.25 |
| 2007/0274085 A1* | 11/2007 | Hampton ...................... 362/500 |
| 2008/0101053 A1* | 5/2008 | Hoffman et al. ................. 362/35 |
| 2009/0034178 A1* | 2/2009 | Le ................................. 361/681 |
| 2009/0168023 A1* | 7/2009 | Tang et al. ...................... 353/13 |
| 2010/0273140 A1* | 10/2010 | Man .............................. 434/371 |

\* cited by examiner

SYSTEM AND METHOD FOR IN SITU DISPLAY OF A VIRTUAL WHEEL ON A WHEELED VEHICLE

BACKGROUND OF THE INVENTION

Field of the Invention

The present invention is generally directed to a system and method for the convenient in situ display of one or more virtual wheel products on a wheeled vehicle. More specifically, the subject system and method provide for the visual simulation of such virtual wheel products being physically installed on the wheeled vehicle, in place of the actual wheel already installed thereon.

With the ever increasing growth of the motorized vehicle parts industry and the ongoing development of manufacturing capabilities, the availability of options for personalizing the appearance of vehicles has increased dramatically over the years. Countless parts and components are available by which owners may customize the style and flair of their vehicles. Wheeled vehicles such as automobiles and motorcycles in particular enjoy a wealth of parts and components availability on an after market basis.

One of the simplest yet most dramatic means to realize aesthetic, if not mechanical, impact upon their vehicles is to replace the wheels, or tire rims, with replacement wheels of more stylish and visually compelling design. Especially on an after market basis, a virtually unending variety of styles and designs are available for wheels of all different sizes. There may be literally thousands of choices to suit a particular vehicle model and its various tire sizes. Invariably, the available wheel products will range widely in material, shape, dimension, graphic detail, color, finish, and the like. They will also range considerably in price, some of the more elaborate types potentially making up a substantial portion of the vehicle's overall value.

Conventionally, when a vehicle owner wishes to replace one or more wheels (or tire rims) with more stylish replacement wheels, that owner will typically browse through a number of choices in either a paper or electronic catalog to make an initial selection of one or more products. As it may be difficult to visualize the various wheel products actually installed on one's particular vehicle, a photograph or other computer-rendered image showing a similar vehicle equipped with the available wheel product(s) may be graphically rendered and displayed to aid the selection. While this is helpful to some degree, the actual likeness of the displayed vehicle image to his or her actual vehicle being comparably equipped may be limited. What is more, even with the highest image quality, viewing a miniaturized image of the vehicle cannot substitute for actually seeing the vehicle live, with the selected wheel product(s) seemingly installed thereon.

Many buyers of replacement wheels, therefore, make their final selection only after the wheel product is physically brought out and placed against their vehicles. This is as close to 'trying on' a new replacement wheel as a buyer may get, as the actual physical installation of the wheel requires considerable effort (to install with a tire and fasten to the vehicle). Moreover, actual physical installation of a wheel invariably risks damaging, and even disfiguring at least some portions of the wheel (those portions bolt-fastened to the vehicle and those portions receiving a pressurized tire, for example).

Though buyers very often resort to this 'try on' process to obtain a somewhat realistic impression of the replacement wheel product's physical installation on their particular vehicles, the process is not without other even more significant—and usually prohibitive—drawbacks. First, wheels are widely varied in size and style for even just one vehicle make and model. Given the great variety of different vehicle makes and models, the actual inventory of available replacement wheel products for a buyer's particular vehicle will tend to be quite limited. Replacement wheel products for only the most popular of vehicle makes and models will typically be on hand to so view against the buyer's vehicle. Even if the wheel product is available, their relatively high cost and physical mass severely limit the number of different sizes that a shop can feasibly maintain in physical inventory; and, the available samples may not be of sufficient size to be of much use in the selection process. Thus, buyers typically enjoy the benefit of directly inspecting at most a few distinct wheel product choices actually suitable for comparative viewing up against his/her vehicle.

Buyers may alternatively settle for viewing other replacement wheel products in stock against their vehicles, even if of the wrong size and style. Obviously, the buyers will not gain a strong and accurate sense of the actually desired products' installation upon their vehicles from viewing such alternative products of improper size and style.

Another drawback of viewing and inspecting actual replacement wheel products held physically up against one's vehicle is the sheer effort required to manually haul a wheel out to the vehicle, and to do so repeatedly for multiple wheel choices. Because of the tremendous loads they bear and the extreme forces they must withstand, vehicle wheels are formed of steel, metallic alloy, or other materials of sufficiently high density and weight. Wheels for even a small-sized sport sedan will typically range on the order of 20-27 pounds, with wheels for larger vehicles ranging substantially higher in weight. This weight, coupled with diametrically extended contours, makes vehicle wheel products generally awkward to handle and difficult to carry.

Yet, a prospective buyer will often wish to view multiple replacement wheel product options against his/her own vehicle parked outside the showroom before making a purchase decision, if any. With each such 'try on' viewing of a different wheel product, shop personnel must manually pull a product choice from a storage rack in the stockroom, haul outside to the vehicle, then delicately hold against one of the vehicle's existing wheels to the prospective buyer's full satisfaction, before returning it and possibly retrieving and yet another product choice in the same tedious manner. The process quickly becomes burdensome and, if the buyer is not entirely decisive, fuels much frustration both on the part of the buyer and seller.

Even aside from the burdensome task of manually hauling the actual replacement wheels back and forth like this, the potential for irreparably damaging these valuable commodities looms very large. Each time shop personnel pick up and set down the new wheel products in stock, they run the risk of accidentally dropping, scratching, denting, or otherwise damaging them. The risk is heightened especially in less controlled environments, like outside the showroom, where the prospective buyer's vehicle would normally be parked. Dropping or even tipping the wheel on hard, abrasive, and unforgiving parking lot pavement could mar a new wheel product to the point of being non-sellable.

There is therefore a need for a system and method whereby a life-like view of a particular replacement wheel product may be simply and conveniently presented for viewing by a prospective buyer against the back drop of his or her own vehicle. There is a need whereby numerous choices of such replacement wheel products may be selectively presented for viewing against the prospective buyer's vehicle, as if they were physically installed thereon.

PRIOR ART

References known in the art include U.S. patent/Patent Application Publication Nos.: U.S. Pat. No. 5,072,536; U.S. Pat. No. 6,363,642; U.S. Pat. No. 2,077,690; U.S. Pat. No. 3,945,132; U.S. Pat. No. 6,879,961; U.S. Pat. No. 6,753,879; U.S. Pat. No. 6,926,369; U.S. Pat. No. 7,271,813; U.S. Pat. No. 3,763,584; U.S. Pat. No. 2,860,436; U.S. Pat. No. 1,796,628; U.S. Pat. No. 1,505,761; U.S. Pat. No. 3,611,601; #2006/0287137; #2005/0174361; #2006/0277806; #2007/0274085; #2006/0208922.

SUMMARY OF THE INVENTION

It is an object of the present invention to provide a system and method for presenting a life-like view of a replacement wheel product may against a prospective buyer's own vehicle.

It is another object of the present invention to provide a system and method whereby numerous choices of viable replacement wheel products may be selectively presented for viewing against the prospective buyer's vehicle, as if they were physically installed thereon.

It is yet another object of the present invention to provide a system and method for simply and conveniently presenting in situ against a vehicle a virtual wheel visually displayed to simulate physical installation thereon.

These and other objects are attained in a system and method provided in accordance with the present invention for visually simulating physical installation of a virtual wheel portion on a wheeled vehicle. The system generally comprises a portable display unit, a controller unit, and a support unit. The portable display unit is operable to graphically render an image of a preselected virtual wheel. The controller unit is operably coupled to the display unit for generating the image selectively for one of a plurality of distinct virtual wheel types. The controller unit adaptively generates the preselected virtual wheel image responsive to a viewing factor. The support unit is coupled to the display unit for adjustably situating such display unit to substantially mask a wheel of the vehicle, whereby the image of the preselected virtual wheel is visually integrated with the vehicle in substantially seamless manner to visually simulate its physical installation on the vehicle.

In certain embodiments, the viewing factor employed in the system includes a viewing angle parameter. The controller is then configured to adjust the preselected virtual wheel image in angular perspective to responsively compensate for a change in the viewing angle parameter.

DESCRIPTION OF THE PREFERRED EMBODIMENTS

Figure 1:
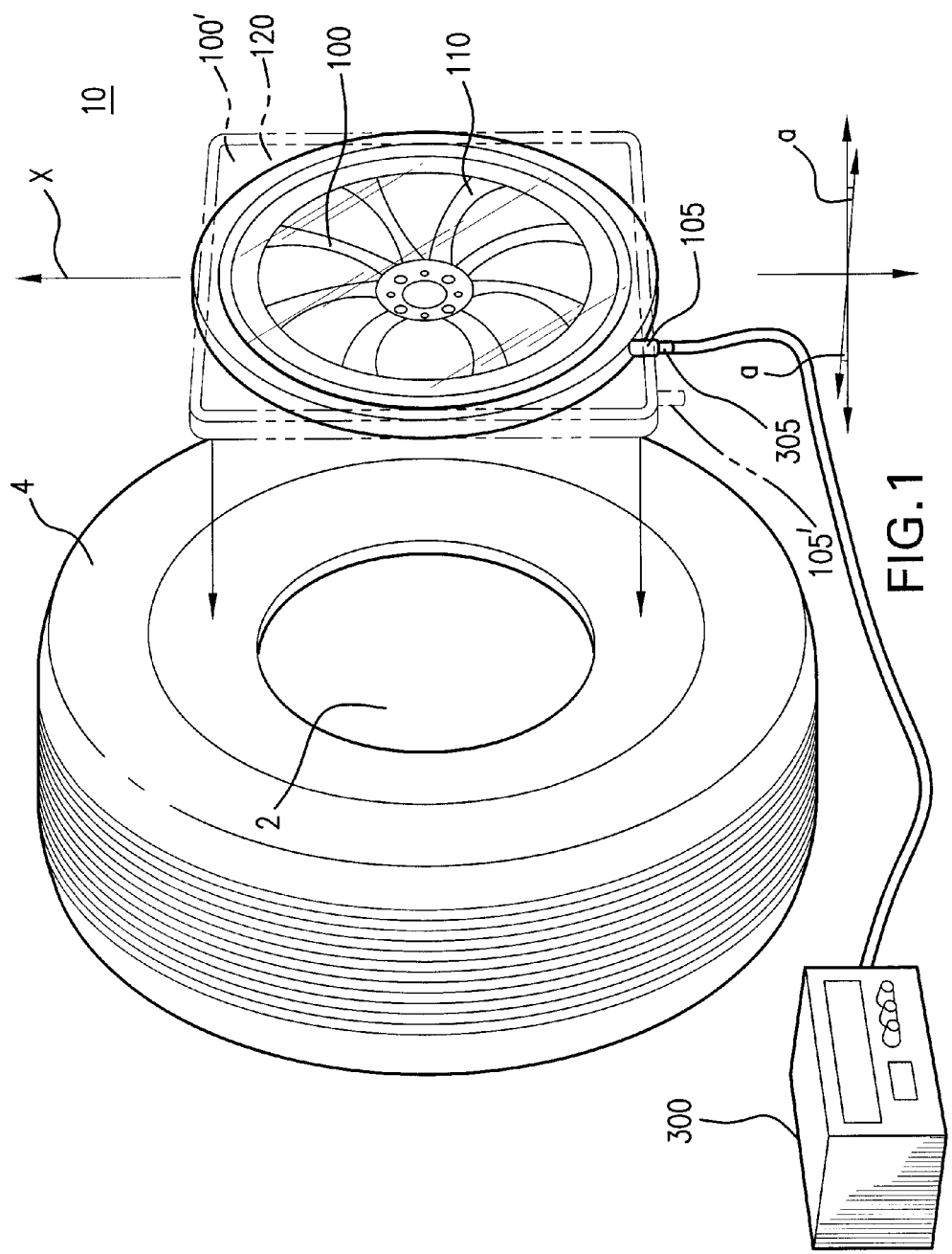
FIG. 1 is a front perspective view schematically illustrating a portable display system formed in accordance with one exemplary embodiment of the present invention.
Figure 2:
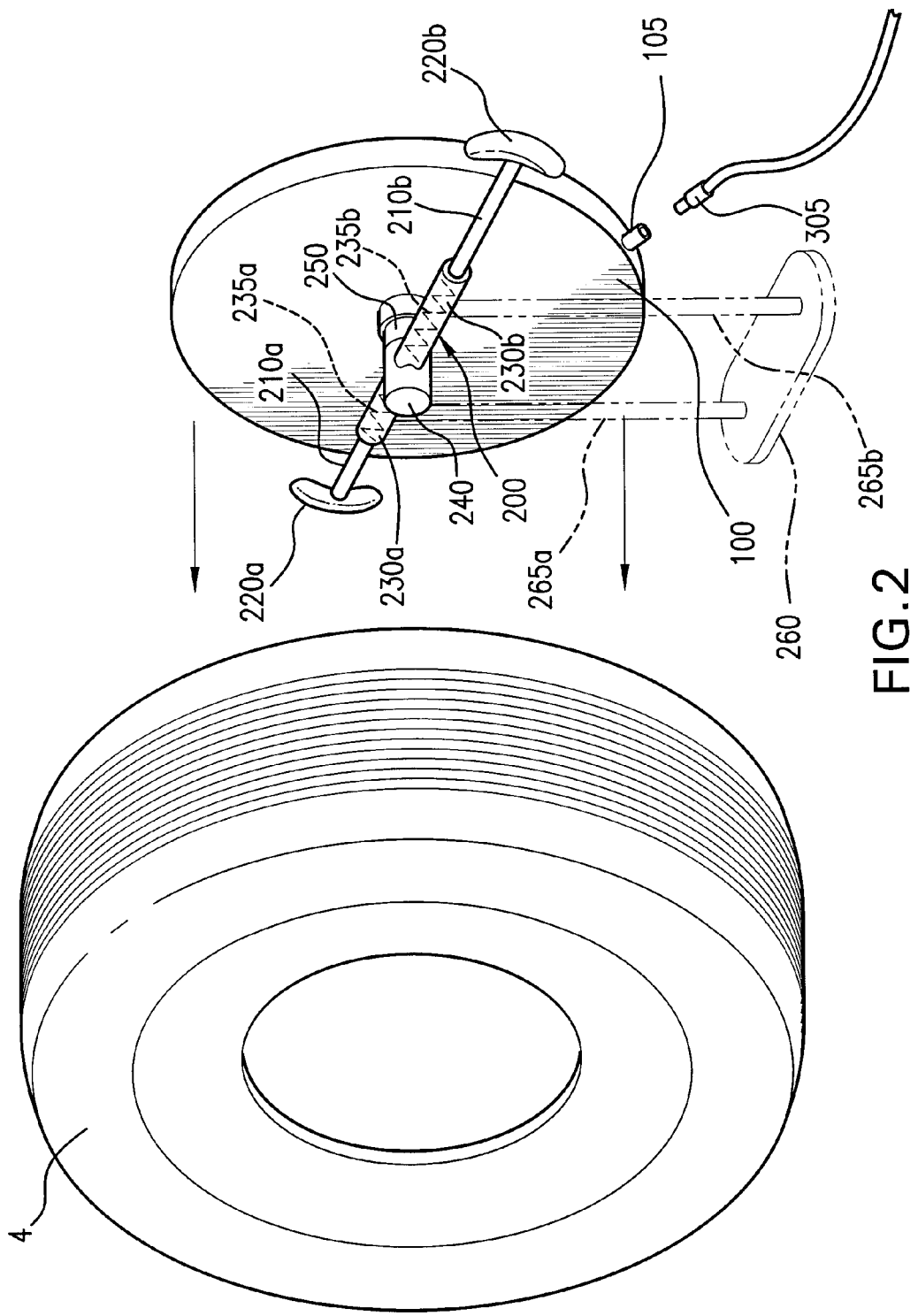
FIG. 2 is a rear perspective view schematically illustrating a portable display system formed in accordance with the exemplary embodiment of FIG. 1.
Figure 3:
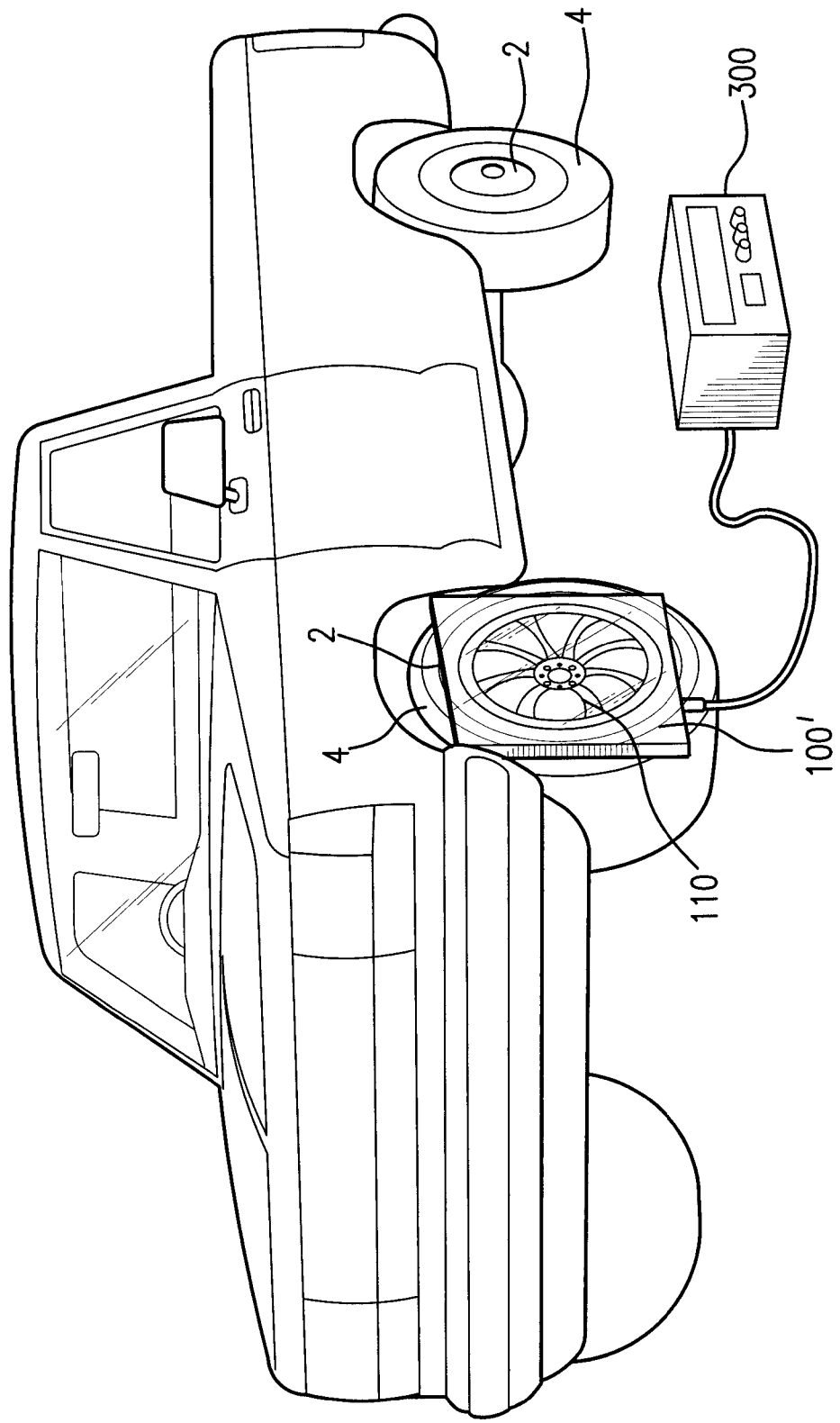
FIG. 3 is a front perspective view schematically illustrating the portable display system formed in accordance with the exemplary embodiment of FIG. 1, applied for use to an automotive wheeled vehicle.
Figure 3A:
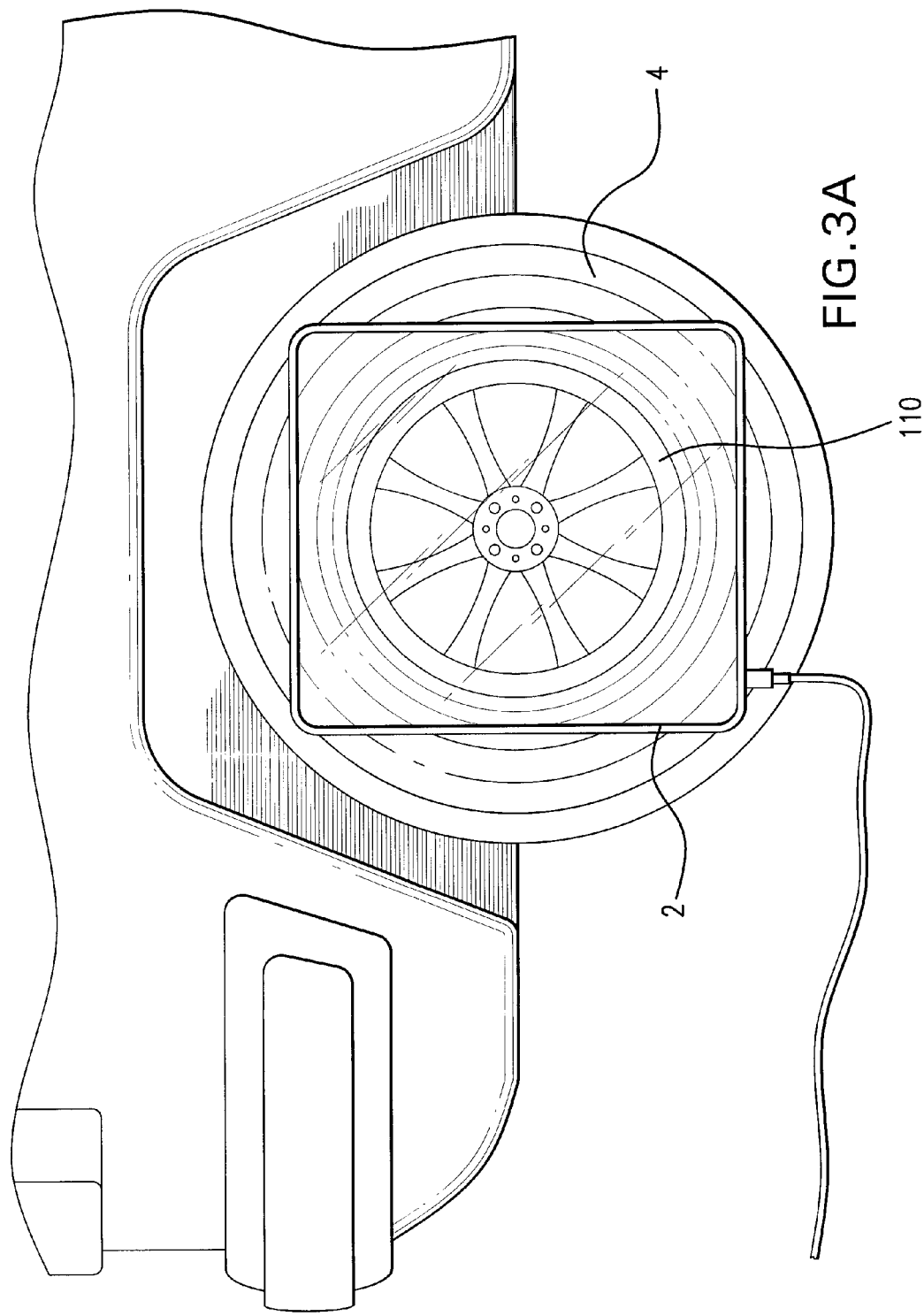
FIG. 3A is a front perspective view schematically illustrating the portable display system formed in accordance with the exemplary embodiment of FIG. 1, displaying a sample replacement wheel against a physical wheel of a given vehicle.

Turning now to FIGS. 1-2, there is schematically shown a portable display system 10 formed in accordance with an exemplary embodiment of the present invention for in situ viewing of virtual wheel products against one's vehicle. System 10 generally includes a portable display unit 100 releasably mountable to the existing physical wheel 2 of the given vehicle via a support unit 200. The portable display unit 100 is operably coupled to a controller unit 300 which drives the selective generation of virtual wheel images thereon. The control unit 300 may be implemented using any suitable processing device known in the art, such as a laptop computer and the like. It is programmably configured to provide selective user access to images for a plurality of available wheel product types. These images may be prestored in the controller unit 300, read in from portable storage media, or dynamically downloaded from an image providing source through a communications link established therewith.

System 10 is generally used as follows in the illustrated embodiment. When a prospective buyer of a new replacement wheel product arrives at a seller's shop in the prospective host vehicle, the seller typically obtains general information regarding the vehicle, such as its year and make, the range of available wheel size and style options, and the buyer's relevant preferences. The seller then makes a suitable search of a predetermined database of wheel products and information for available product options. The prospective buyer makes preliminary choices from these options, whereupon the display unit 100 of system 10 is taken to the parked vehicle and carefully mounted on one or more of its wheel portions. When properly installed, the supporting unit 200 securely yet releasably engages the given wheel or portions of the vehicle structure immediately surrounding it, while remaining substantially hidden from view behind the display unit 100.

The seller would then operate controller unit 300 to sequentially generate on the display unit 100 appropriate, life-like images of the wheel types preliminarily selected by the prospective buyer. Using suitable techniques known in the art for photographic rendering and/or image processing, the controller unit 300 operates to optimally adapt the rendered wheel image to such prevailing conditions as: the image area size relative to the physical wheel/tire structure, the user's viewing angle, ambient light (intensity and direction of sunlight and resulting reflectivity), and the like. The adaptive refinements and adjustments necessary for each selected wheel image is suitably processed and applied to graphically render a virtual, true to life image on the display unit 100.

The resulting image visually blends almost seamlessly with the surrounding portions of the physical tire 4 and vehicle structure which are visible peripherally about the display unit. The composite view of the image against the physical backdrop of the vehicle and tire simulates the apparent installation of the displayed wheel product physically on the vehicle, so that the prospective buyer can obtain as true and life-like an impression of the same—without the trouble and expense of obtaining a product sample and actually installing. The prospective buyer may scroll through various wheel choices, conveniently pausing to view the virtual installation on the vehicle of each product choice. In this manner, an exhaustive library of available wheel product options may be fairly and meaningfully considered even when samples of the product may not be available on site. Even if a sample were available, meaningful consideration may be given to the product without the undue burden, inconvenience, delay, and risk of damage of actually 'trying-on' the wheel choice before making a purchase decision.

Where necessary, the controller unit 300 adapts the image to be rendered on the display unit 100 to the appropriate viewing conditions. As described in following paragraphs, the controller unit 300 preferably configures the image of a selected wheel to the prevailing conditions. For example, the given display unit 100 for certain vehicles may be large enough to cover and obscure not only the central wheel/rim portion 2 of the given vehicle wheel, but also parts of the surrounding tire sidewall portion 4. The controller unit 300 would then compensate the selected wheel image by supplementing it with peripheral image portions corresponding to the overlapped (and obscured) parts of the tire sidewall portion 4. That is, the controller unit 300 would effectively 'repair' the obscuration by visually 'regenerating' the obscured parts as part of the displayed image. A substantially seamless visual integration is preserved between the image displayed by unit 100 and the parts of the vehicle wheel and tire physically visible thereabout.

In order to ensure the display unit's adequate visual coverage of the physical wheel portion 2, the display unit 100 is preferably sized in viewing area to be comparable to at least the largest physical wheel portion 2 for expected uses of system 10. This would ensure that the display unit 100 physically masks the entirety of the wheel portion 2 that is to be visually replaced with the selected virtual substitute wheel displayed by unit 100.

Smaller sized physical wheel portions 2 may be readily accommodated on the display unit 400 by the controller unit 300 graphically compensating to 'repair' the selected wheel image, in much the manner described in preceding paragraphs. In this regard, the wheel image would preferably be centered on the viewable area of the display unit 100. Surrounding regions of the viewable area left over about the wheel image would be filled to replicate the innermost parts of the vehicle tire 4 obscured by the display unit. Such innermost parts of the vehicle tire 4 are shown to extend neatly to the virtual wheel displayed.

Conversely, a smaller diameter wheel option available for a vehicle may be accommodated, although it would require tires which are smaller in inner diameter than the given vehicle tire 4. The inner periphery of the vehicle tire 4 in that case would be virtually compensated for on the display unit's viewable area, so as to extend radially inward by a suitable amount to reach the displayed wheel image.

Any suitable display technology known in the art may be employed in display unit 100. Preferably, the display employs a liquid crystal, plasma, or any other such flat panel display technology suitable to produce high quality, life-like reproductions of graphic, photographic, and/or video images. Preferably, most—if not all—of the front visible surface of the display unit 100 forms part of the viewable area which contributes to the displayed image. Some structural border for the viewable image area is unavoidable with most readily available display technology options. Where such structural borders are unavoidable, suitable measures may be taken to minimize the visual discontinuity they invariably cause. For example, in addition to minimizing their width and profile, such borders may be formed of a suitable transparent material, formed with a discrete, neutral surface finish, or otherwise treated in a dark color to blend in with the dark rubber composition of tires 4 against which they are typically viewed.

In the embodiment shown, display unit 100 is formed with a circular peripheral contour consistent with the circular contour of typical wheel portions 2. When a full sized wheel image 110 is generated thereon, the display unit 100 may neatly cover just the central wheel portion 2 on the given vehicle, with the physical tire portion 4 remaining fully visible around it. As described in preceding paragraphs, images 110 which replicate to scale wheels of lesser diameter than the physical wheel 2 may be readily viewed with the controller unit 300 'filling in' the remaining viewable regions 120 around the image 110. This visually simulates the circumferential extension of the tire portion 4 fully to the wheel image 110.

The display unit may be of any suitable size and configuration for the intended application. For example, a slightly oversized display unit 100' with a square, rectangular, or any other suitable peripheral contour may be employed in alternate embodiments, depending on the requirements of the intended application. The excess masking of the physical tire portion 4 by such alternately sized/shaped display unit 100' may be visually compensated for by the controller unit 300 'filling in' with corresponding image portions to replicate the physical portions which have been masked.

In accordance with a general aspect of the present invention, system 10 operates to overlay the existing wheel of a prospective buyer's actual vehicle with a high quality, lifelike image of a replacement wheel (or 'rim') to view against the backdrop of that vehicle. The prospective buyer thus gains a helpful, realistic impression of how the displayed choice of wheel would actually appear when physically installed on his/her own vehicle.

Often, the individual will not only wish to view the wheel choice virtually 'installed' in this manner squarely from the side of the vehicle (facing the exposed side face of the wheel, along its central axis), but will also wish to view the same wheel from an off-axis position to obtain more of a perspective view. To accommodate such off-axis viewing, the display unit 100, 100' is preferably displaceable angularly about a predefined axis X. As illustrated in FIG. 1, the display unit 100, 100' may be angularly displaced about the axis X by an angle a. The extent of this angular displacement will be limited by the clearance between the rear panel of the display unit 100, 100' and the vehicle's wheel and tire portions 2, 4 immediately behind it.

Where the angular displacement a is sufficiently great, controller 300 operates to suitably update the wheel image 110 in coordination therewith. For example, 3-dimensional features such as surface projections, protrusions, and recesses may not be discernable as such from a squarely addressed direct facial view of a particular wheel, but become more pronounced and discernable, as the wheel is viewed from a more off-axis, or angular, perspective. Preferably through a combination of pre-stored perspective image data and image processing techniques, controller 300 adapts the image 110 responsive to the viewer's change in viewing angle (relative to the vehicle's stationary wheel and tire portions 2, 4).

Note that the viewer's change in viewing angle (an indication of which may be directly entered in the system via a user interface provided for the controller unit 300) may not evenly correlate to the display unit's angular displacement angle a. Since the display unit 100 typically provides a planar, 2-dimensional viewing surface, image brightness and/or quality increasingly diminishes the more a viewer moves away from a direct frontal, on-axis viewing angle. Moreover, since the viewing surface is 2-dimensional, a viewer will not gain any greater a perspective view of the actual item whose image is displayed on the viewing surface simply by changing his/her viewing angle relative to the viewing surface. The content of the image itself must be modified accordingly. Thus, angular displacement of the display unit 100, 100' by an angle a is effected largely to preserve clarity and brightness of display to the viewer. It is the adaptive modification of the image content effected by the controller unit 300 which shows the 3-dimensional attributes of the wheel depicted by the image 110 that would be visible from a particular viewing angle.

Figure 4:
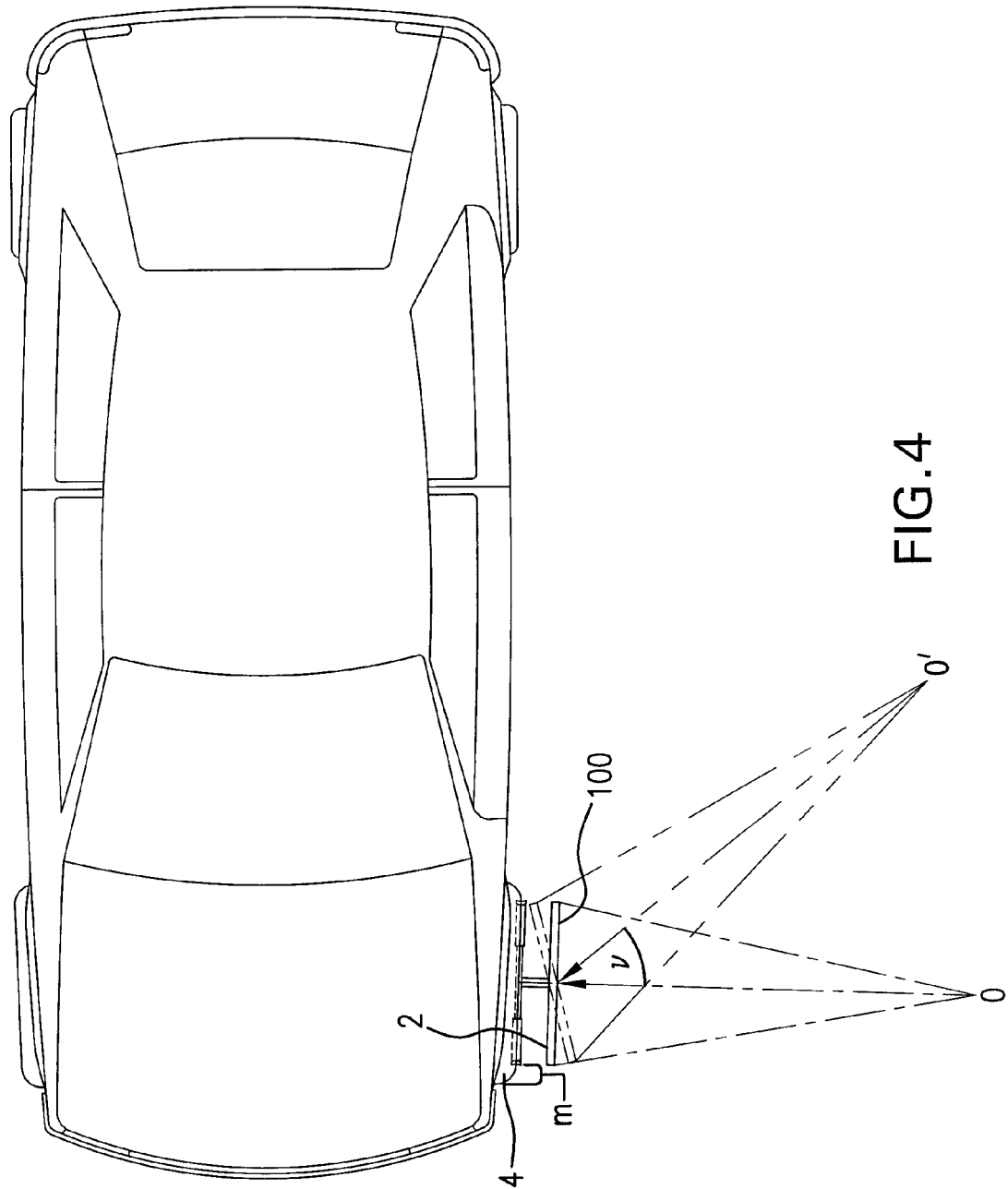
FIG. 4 is a plan view schematically illustrating an aspect of the portable display system formed in accordance with the exemplary embodiment of FIG. 1.

Depending on the degree of viewing angle offset (from the direct frontal view position) and/or the angle a by which the display unit 100 may be turned, additional portions of the vehicle's tire 4 may be masked from view by the display unit 100, 100'. FIG. 4 schematically illustrates one such situation where the region m immediately about one side of the vehicle's wheel portion 2 may be shielded from view by the display unit 100. This region m would be visible otherwise from the direct frontal, 'zero' degree, viewing angle indicated the axis by O in FIG. 4. To preserve the seamless visual integration of the display unit's wheel image with the surrounding tire portion 4, controller unit 300 preferably updates the displayed image to again 'fill in' around the wheel image with a graphic replication of the masked tire region m. The tire region m would then appear to the viewer almost as if it had not been physically shielded at all by the display unit 100. The replicating image portions rendered by controller unit 300 would preferably correspond in perspective to the offset angle v from which the region m would be viewed (to the extent that it would be visible—at that viewing angle—about any protruding portions of the wheel depicted in the image).

Other measures may also be taken by the controller unit 300 to optimize the seamless visual integration of the wheel image against the physical backdrop of the vehicle and its tire portions 4. If, for example, the wheel depicted in the displayed image is of a chrome or other highly reflective finish (as many aftermarket wheels/rims tend to be), its light-reflective properties contribute significantly to the overall aesthetic effect. The wheel's appearance under sunlight, overcast, artificially lit, nightlight, or other such ambient conditions when viewing may weigh heavily upon the purchasing decision. If nothing else, it would be preferable to effectively match the viewing conditions depicted in the displayed image to the actual conditions under which the physical backdrop is being viewed. That is, if the vehicle is parked outside midday on a bright sunny occasion, the image displayed by the unit 100 should depict like viewing conditions—with the depicted wheel suitably reflecting the sunlight emanating from the midday sun almost directly overhead. Visual consistency is preserved in this manner between the physical and virtual components of what the viewer actually views.

Much as with the changes in viewing angle, the controller unit 300 may access an extensive library of pre-stored wheel product images corresponding to various viewing conditions toward this end. Alternatively, the controller unit 300 may apply suitable image processing techniques to accordingly adapt an existing wheel image. The controller unit 300 may also perform a combination of these approaches to exhibit the appropriate viewing conditions in the displayed image.

Figure 5:
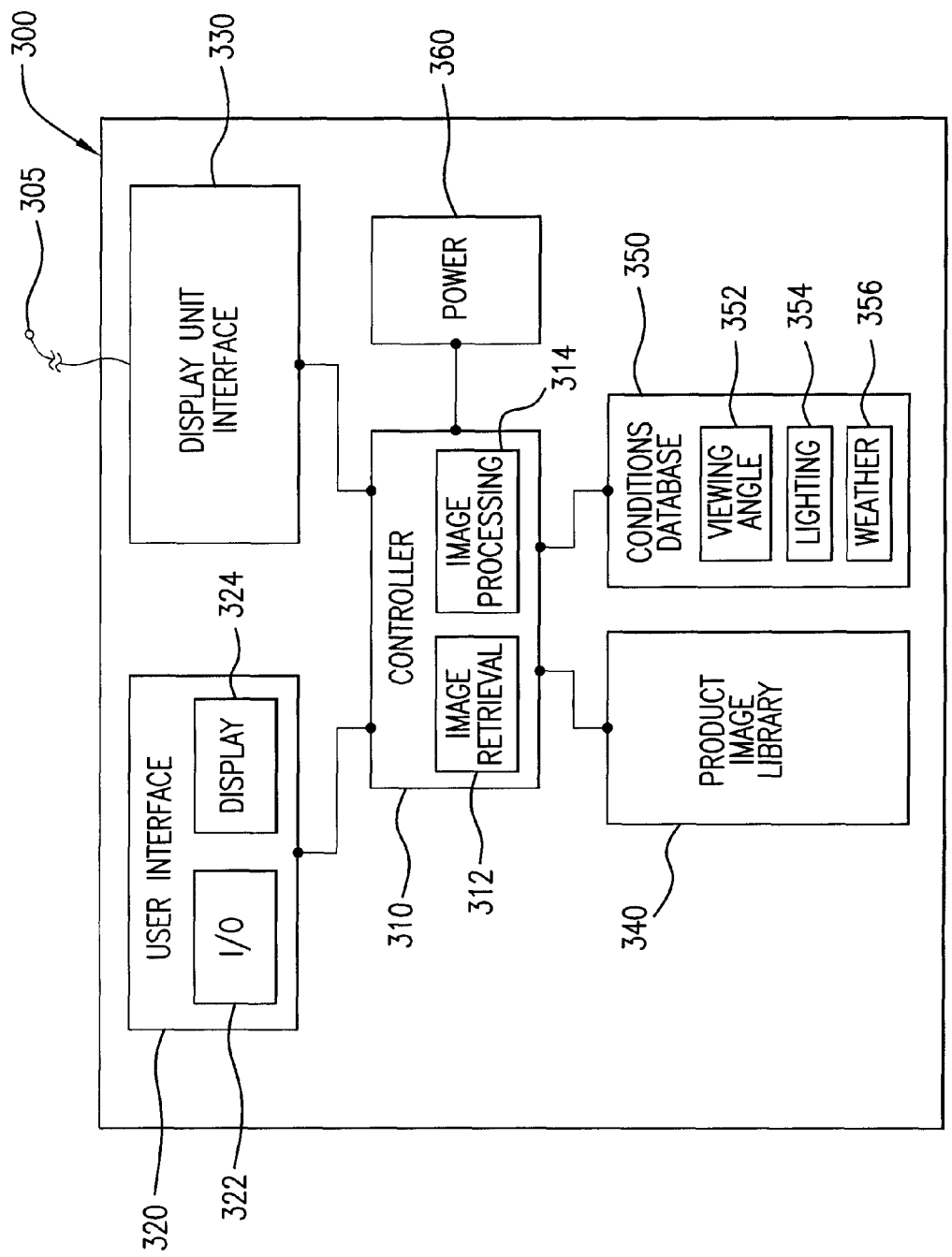
FIG. 5 is a block diagram schematically illustrating the interconnection of functional modules in accordance with an exemplary embodiment of a portion of the portable display system formed in accordance with the exemplary embodiment of FIG. 1; and, FIG. 6 is a partially sectioned view illustrating adjustment of a portion of the exemplary embodiment shown best in FIG. 2.

FIG. 5 schematically illustrates the interconnection of functional modules in accordance with an exemplary embodiment of the controller unit 300. In the illustrated embodiment, controller unit 300 preferably includes a microprocessor-based controller 310. Controller 310 is programmably configured to not only control a user interface 320, but also to drive the adaptive rendering of wheel images for display on the unit 100 via the display unit interface 330. The controller 310 includes an image retrieval sub-unit 312 by which one or more user-selected images most suitable for the prevailing conditions are obtained from a product image library 340. Product image library 340 may be provided in the form of a locally accessible data storage medium, or via suitable communications link to a remote source of product image data.

Controller 310 preferably also includes an image processing sub-unit 314 by which the effects of various image-altering conditions are preferably applied to the given product image for display. Image processing sub-unit 314 serves to generate the image-altering effects based upon information provided via the user interface 320 and the product image library and/or conditions database 340, 350. Alternatively, image processing subunit 314 may operate to select and apply conditional factors such as viewing angle 352, ambient lighting 354, weather 356, or the like made available at conditions database 350.

The user interface 320 provided by controller unit 300 preferably includes keyboard or other such user input/output (I/O) device 322, as well as a local display device 324. Preferably, the display device 324 is a graphic display monitor of any suitable type known in the art by which a graphic user interface may be generated to guide utilization of system 10. One or more selection menus may be provided via such graphic user interface, for example, to guide a prospective buyer's preliminary selection of wheel products for in situ viewing on display unit 100.

In the embodiment shown, controller unit 300 preferably includes a connector 305 which mates with connector 105 of the display unit 100 for the passage of data therebetween. This connection is preferably used also for powering the display unit 100 via a power supply 360 provided with controller unit 300 as shown. The power supply 360 preferably provides sufficient power to run the functional modules of both the controller unit 300 and display unit 100. Although a separate power source may be provided for the display unit 100 by any suitable means known in the art, the illustrated approach minimizes the display unit's external connections and the need for extraneous hardware to be provided thereon.

In certain alternate embodiments, the wired connection via the mated connectors 105 and 305 may be replaced by any suitable wireless communications link measures known in the art. The controller unit would then communicate through a suitable interface at the display unit 100 for responsive operation in accordance with the present invention. In such embodiments, the display unit 100 may be powered via its own local power source (such as a battery cell or the like), or via an external power source separately connected thereto.

Figure 6:
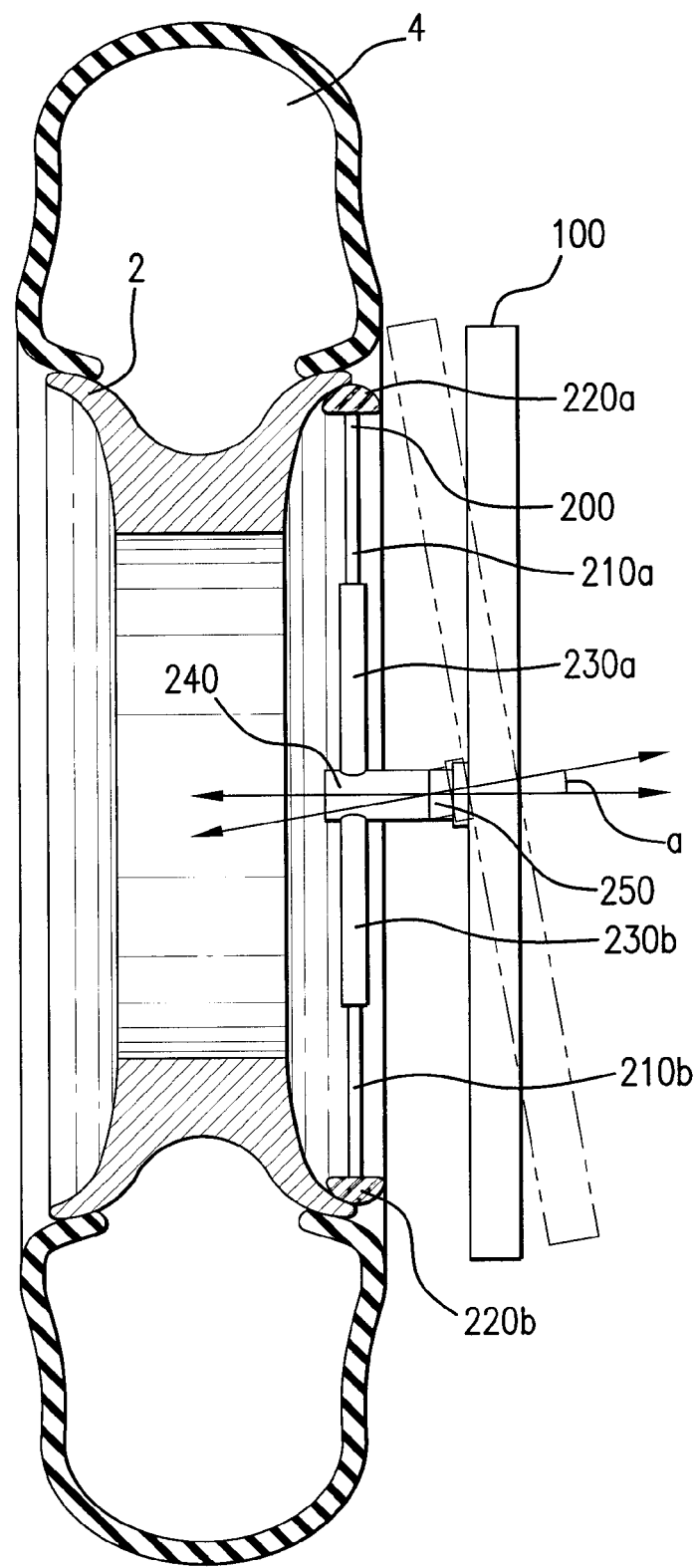

Referring more closely to FIGS. 2 and 6, support unit 200 is configured in accordance with one aspect of the present invention to provide discrete yet secure, detachable coupling of the display unit 100 to the existing wheel or surrounding tire portions of the given vehicle. Preferably, support unit 200 is configured to remain fully shielded behind the display unit 100, so as to remain hidden to a viewer of the display unit 100. Toward that end, support unit 200 in the embodiment shown is formed as a spring-loaded bracing arm whose arm members 210a, 210b respectively press a pair of frictional pads 220a, 220b against the inner rim of the vehicle's wheel portion. This provides a firm yet quick and convenient mounting to the vehicle which is itself intended to remain hidden from view behind the display unit 100.

As shown, support unit 200 is formed with a pair of tubular extensions 230a, 230b which radiate outward from a hub member 240. A spring element 235a, 235b is disposed within each tubular extension 230a, 230b. Each arm 210a, 210b is telescopically received within a corresponding extension arm 230a, 230b to then capture a spring element 235a, 235b against the hub member 240. Suitable measures are employed to retain this telescopic coupling of the arm members 210a, 210b and their respective tubular extensions 230a, 230b, such that they do not fall out when support unit 200 is removed from wheel mounting. The spring elements 235a, 235b are of sufficient elasticity and strength to provide bias forces radially outward to keep the diametrically opposed pads 220a, 220b frictionally engaged to the surrounding rim surface when properly positioned within the vehicle's wheel portion 2.

Where necessary, the pads 220a, 220b may be configured to suitably engage an outer periphery of the vehicle wheel or rim for secure attachment. In certain embodiments, moreover, it may be preferable to configure and bias the spring elements 235a, 235b to pull inward on the arms 210a, 210b. Suitable measures would be employed as needed to maintain secure retentive coupling to corresponding portions of the wheel.

The display unit 100 is preferably mounted via a pivotal or other angularly displaceable coupling 250 to the hub member 240. Any suitable mechanism known in the art may be employed to form this coupling. In the exemplary structure shown, for instance, a ball and socket or other pivoted joint is employed for the coupling. The coupling 250 is preferably configured such that it spaces the rear panel of the display unit 100 with sufficient clearance away from the vehicle's rim and tire portions 2, 4 to enable a suitable range of angular displacement a, as illustrated. This permits the image bearing surface of the display unit 100 to be oriented to at least partially compensate for a viewer's change in viewing position to an off-axis line of view O' (illustrated in FIG. 4). While the turn of the display monitor 100 permitted by the available clearance from the surrounding structure may be relatively slight compared to the actual change in viewing angle, the turn may nonetheless be significant enough to preserve image brightness and noticeably minimize surface glare or other such impediments to clear visibility of the displayed image.

In the embodiment shown, the coupling 250 is a manually adjustable one. This preserves simplicity of structure and convenience of use. In other embodiments, however, the coupling 250 may be an automatically actuated one. In that case, the controller would be equipped with sufficient programmable measures to actuate a motorized mechanism disposed at such coupling 250. In other alternate embodiments, moreover, the support unit 200 may employ any other suitable combination of structural elements to detachably mount display unit 100 to a wheel or tire portion 2, 4 of the given vehicle.

Referring back to FIG. 2, the support unit 200 may in certain other embodiments be supported in freestanding manner. As illustrated, one or more support legs 265a, 265b may be coupled to the tubular extensions 230a, 230b, and/or the hub 240, so that the display unit may simply be placed in front of the given wheel. Such freestanding support would simplify use, obviating the need for biased engagement of the feet-like pads 220a, 220b with the wheel. The height of support may be adjusted accordingly by forming each support leg 265a, 265b to be adjustable in length. This will provide a simple, more conveniently positioned system, though the overall visual effect may be diminished some given the display unit's increased spacing from the vehicle wheel with this embodiment. The choice of support configuration will depend on the particular requirements of the intended application Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular combinations of processing steps and functional components may be reversed or interposed, all without departing from the spirit or scope of the invention as defined in the appended claims.

What is claimed is:

1. A system for visually simulating physical installation of a virtual wheel portion on a wheeled vehicle comprising:
    a. a portable display unit disposed over a physical wheel of a vehicle operable to graphically render an image of a preselected virtual wheel;
    b. a controller unit operably coupled to said display unit for generating said image selectively for one of a plurality of distinct virtual wheel types, said controller unit adaptively generating said preselected virtual wheel image responsive to a viewing factor; and,
    c. a support unit coupled to said display unit for adjustably situating said display unit to substantially cover a planar face of the physical wheel of the vehicle;
        whereby said image of said preselected virtual wheel is visually integrated with the vehicle in substantially seamless manner to visually simulate physical installation thereof on the vehicle.

2. The system as recited in claim 1 wherein said viewing factor includes a viewing angle parameter, said controller adjusting said preselected virtual wheel image in angular perspective to responsively compensate for a change in said viewing angle parameter.

3. The system as recited in claim 2 wherein said support unit supports said display unit in angularly adjustable manner, said display unit being displaceable between at least first and second positions, said display unit in said first position being disposed in substantially coplanar manner relative to the vehicle wheel, said display unit in said second position being obliquely angled relative to the vehicle wheel; said preselected virtual wheel image being correspondingly adjusted by said controller unit in perspective for said obliquely angled position.

4. The system as recited in claim 3, wherein said preselected virtual wheel image includes an image representing a portion of a tire about the vehicle wheel obscured from view by said portable display unit due to the change in said viewing angle parameter.

5. The system as recited in claim 1, wherein said portable display unit partly obscures from view a portion of a tire about the vehicle wheel to simulate different wheel rim sizes, said preselected virtual wheel image including an image representing the obscured portion of the vehicle tire, whereby said images for virtual wheel types of different diametric dimension may be seamlessly integrated with the vehicle.

6. The system as recited in claim 1, wherein said viewing factor includes an ambient lighting parameter, said preselected virtual wheel image being adjusted responsive to said ambient lighting parameter to alternatively reflect at least sunlight exposed and overcast viewing conditions.

7. The system as recited in claim 1, wherein said support unit is configured for releasable self-centered fastening to the vehicle wheel.

8. The system as recited in claim 7, wherein said support unit includes a frame member for fastening to the vehicle wheel, and a holding member coupled in pivotally displaceable manner thereto.

9. The system as recited in claim 1, further comprising a storage unit having stored therein image data for said plurality of distinct virtual wheel types for selective retrieval responsive to said controller unit.

10. A system for visually overlaying a tire rim of a vehicle with an image of a virtual substitute therefor, the system comprising:
   a. a portable display unit disposed over a physical tire rim of a vehicle operable to graphically render an image of a preselected virtual tire rim;
   b. a controller unit operably coupled to said display unit for generating said image selectively for one of a plurality of distinct virtual tire rim types, said controller unit adaptively generating said preselected virtual tire rim image responsive to a viewing factor; and,
   c. a support unit coupled to said display unit for adjustably situating said display unit to substantially cover a planar face of the physical tire rim of the vehicle, said preselected virtual tire rim image forming a visual substitute for the tire rim with a tire of the vehicle being visible thereabout;
      whereby said image of said preselected virtual tire rim is visually integrated with the vehicle in substantially seamless manner to visually simulate physical installation thereof on the vehicle.

11. The system as recited in claim 10 wherein said viewing factor includes a viewing angle parameter and an ambient lighting parameter;
   said controller unit adjusting said preselected virtual tire rim image in angular perspective to responsively compensate for a change in said viewing angle parameter; and,
   said controller unit responsive to said ambient lighting parameter adjusting said preselected virtual tire rim image to alternatively reflect at least sunlight exposed and overcast viewing conditions.

12. The system as recited in claim 11, wherein said support unit supports said display unit in angularly adjustable manner, said display unit being displaceable between at least first and second positions, said display unit in said first position being disposed in substantially coplanar manner relative to the physical tire rim of the vehicle, said display unit in said second position being obliquely angled relative to the physical the rim of the vehicle; said preselected virtual tire rim image being correspondingly adjusted in perspective for said obliquely angled position.

13. The system as recited in claim 12, wherein said preselected virtual tire rim image includes an image representing a portion of the tire about the tire rim obscured from view by said portable display unit due to the change in said viewing angle parameter.

14. The system as recited in claim 10, wherein said portable display unit partly obscures from view a portion of the tire about the vehicle tire rim to simulate different tire rim sizes, said preselected virtual tire rim image including an image representing the obscured portion of the vehicle tire, whereby said images for virtual tire rim types of different diametric dimension may be seamlessly integrated with the vehicle.

15. The system as recited in claim 10, wherein said support unit is configured for releasable self-centered fastening to the physical tire rim of the vehicle, said support unit including a frame member for fastening to the physical tire rim of the vehicle, and a holding member coupled in pivotally displaceable manner thereto.

16. The system as recited in claim 10, further comprising a storage unit having stored therein image data for said plurality of distinct virtual tire rim types for selective retrieval responsive to said controller unit.

17. A method for selectively displaying in situ upon a wheel of a vehicle a plurality of virtual wheels of distinct design, comprising the steps of:
   a. establishing a portable display unit disposed over a physical wheel of the vehicle operable to graphically render an image of a virtual wheel;
   b. adjustably situating said portable display unit to substantially cover a planar face of the physical wheel of the vehicle;
   c. generating on said display unit said images of virtual wheels selected from a plurality of distinct virtual wheel types, each of said images being adaptively generated responsive to a viewing factor; and,
      images of said selected virtual wheels each being thereby visually integrated with the vehicle in substantially seamless manner, physical installation thereof on the vehicle is visually simulated.

18. The method as recited in claim 17, wherein said viewing factor includes at least one of:
   a viewing angle parameter for determining an angular perspective of each said selected virtual wheel image, each said selected virtual wheel image being automatically adjusted in angular perspective to responsively compensate for a change in said viewing angle parameter; and,
   an ambient lighting parameter for determining a degree of light exposure of each said selected virtual wheel image, said selected virtual wheel image being automatically adjusted to alternatively reflect at least sunlight exposed and overcast viewing conditions.

19. The method as recited in claim 17, wherein said selected virtual wheel image includes an image representing a portion of a tire about a tire rim obscured from view by said portable display unit for adaptively preserving substantially seamless integration of said selected virtual wheel image with the vehicle.

20. The system as recited in claim 17, wherein image data for a plurality of said distinct virtual wheel types are digitally pre-stored locally with said portable display unit for selective retrieval and display.

\* \* \* \* \*